(12) United States Patent
Fields et al.

(10) Patent No.: US 10,055,967 B1
(45) Date of Patent: Aug. 21, 2018

(54) ATTENTIVENESS ALERT SYSTEM FOR PEDESTRIANS

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/605,558

(22) Filed: May 25, 2017

(51) Int. Cl.

| | |
|---|---|
| G08B 1/00 | (2006.01) |
| G08B 21/18 | (2006.01) |
| H04W 64/00 | (2009.01) |
| H04L 12/58 | (2006.01) |
| H04W 4/02 | (2018.01) |
| G08B 7/06 | (2006.01) |
| H04W 4/22 | (2009.01) |
| G01C 21/20 | (2006.01) |
| H04W 4/90 | (2018.01) |

(52) U.S. Cl.
CPC .......... *G08B 21/182* (2013.01); *G01C 21/20* (2013.01); *G08B 7/06* (2013.01); *H04L 51/32* (2013.01); *H04W 4/023* (2013.01); *H04W 4/22* (2013.01); *H04W 4/90* (2018.02); *H04W 64/003* (2013.01)

(58) Field of Classification Search
CPC ........ G08B 21/182; G08B 7/06; G01C 21/20; H04L 51/32; H04W 5/023; H04W 4/22; H04W 64/003
USPC .................. 340/539.1, 539.11, 539.13, 573.1
See application file for complete search history.

(56) References Cited

U.S. PATENT DOCUMENTS 9,863,778 B2 * 1/2018 Anderson
2017/0176202 A1 * 6/2017 Anderson .......... G01C 21/3492

* cited by examiner

*Primary Examiner* — Daryl Pope
(74) *Attorney, Agent, or Firm* — Marshall, Gerstein & Borun LLP; Randall G. Rueth

(57) ABSTRACT

An alert may be initiated for a pedestrian when the pedestrian approaches nearby crowd activity (e.g., parade, protest, concert, etc.). Crowd activity may be indicated by real time crowd data, and/or by accessing means such as popular social media posts, local news, and/or local event calendars. The alert may be generated when a pedestrian comes within a certain threshold distance of the crowd activity (e.g., as determined by a mobile device GPS). A pedestrian who may be inattentive in some way (e.g., looking down at a mobile device) may become attentive to the nearby crowd activity, and may choose to take an alternative route. In additional or alternative embodiments, the alert may be initiated when the pedestrian approaches a nearby safety concern (e.g., fire, crime, etc.). Safety concerns may be indicated by accessing local news, popular social media posts, and/or public safety communications.

19 Claims, 3 Drawing Sheets

US 10,055,967 B1

ATTENTIVENESS ALERT SYSTEM FOR PEDESTRIANS

TECHNICAL FIELD

The present disclosure generally relates to technology for alerting a pedestrian of nearby crowd activity or a nearby safety concern.

BACKGROUND

In recent years, personal mobile devices have become commonplace. Such mobile devices may be used, for instance, to send text messages or emails, browse the web, watch movies and television shows, play games, take photos, play music, etc., from any location. Pedestrians may even use such mobile devices while walking from point to point. However, when using a mobile device, a pedestrian may become distracted and potentially unaware of his or her surroundings. For instance, a distracted pedestrian may be unaware of the presence of a large crowd (e.g., a concert, a rally, a protest, etc.) or a safety concern (e.g., a crime in progress, a fire, a construction zone, etc.) that may be near the pedestrian or near a walking route of the pedestrian.

SUMMARY

In one aspect, a computer-implemented method for alerting a pedestrian of nearby crowd activity is provided. The method may include receiving, by an electronic device associated with a pedestrian, an indication of crowd activity, including the size of a crowd and the position of the crowd. The method may further include receiving, by the electronic device associated with the pedestrian, an indication of the current position of the electronic device. Additionally, the method may include triggering, by the electronic device associated with the pedestrian, an alert based on the indication of crowd activity. The alert may be configured to notify the pedestrian of the crowd activity. Moreover, the alert may be triggered only when the size of the crowd exceeds a threshold number of people and the position of the crowd is within a certain threshold distance of the current position of the electronic device. Furthermore, the method may include receiving, by the electronic device, an indication of one or more of the following: the size of the crowd no longer exceeds the threshold number, the position of the crowd is no longer within the certain threshold distance of the current position of the electronic device, and/or a dismissal of the alert by the pedestrian; and ceasing, by the electronic device, the alert.

In another aspect, a computer-implemented method for alerting a pedestrian of a nearby safety concern is provided. The method may include receiving, by an electronic device associated with a pedestrian, an indication of a safety concern including the position of the safety concern. The method may further include receiving, by the electronic device associated with the pedestrian, an indication of the current position of the electronic device. Additionally, the method may include triggering, by the electronic device associated with the pedestrian, an alert based on the indication of the safety concern. The alert may be configured to notify the pedestrian of the safety concern. Moreover, the alert may be triggered only when the position of the safety concern is within a certain threshold distance of the current position of the electronic device. Furthermore, the method may include receiving, by the electronic device, an indication of one or more of the following: the position of the safety concern is no longer within the certain threshold distance of the current position of the electronic device, or a dismissal of the alert by the pedestrian; and ceasing, by the electronic device, the alert.

In still another aspect, an electronic device associated with a pedestrian and configured to alert a pedestrian of nearby crowd activity is provided. The electronic device may include a transceiver configured to communicate data via at least one network connection, a memory configured to store non-transitory computer executable instructions, and a processor configured to interface with the transceiver and the memory, and configured to execute the non-transitory computer executable instructions. The non-transitory computer executable instructions may cause the processor to receive an indication of crowd activity, including the size of the crowd and the position of the crowd. The non-transitory computer executable instructions may further cause the processor to receive an indication of the current position of the electronic device. Additionally, the non-transitory computer executable instructions may cause the processor to trigger an alert based on the indication of crowd activity. The alert may be configured to notify the pedestrian of the crowd activity. Moreover, the alert may be triggered only when the size of the crowd exceeds a threshold number of people and the position of the crowd is within a certain threshold distance of the current position of the electronic device. Furthermore, the non-transitory computer executable instructions may cause the processor to receive an indication of one or more of the following: the size of the crowd no longer exceeds the threshold number, the position of the crowd is no longer within the certain threshold distance of the current position of the electronic device, or a dismissal of the alert by the pedestrian; and cease the alert.

DETAILED DESCRIPTION

Figure 1:
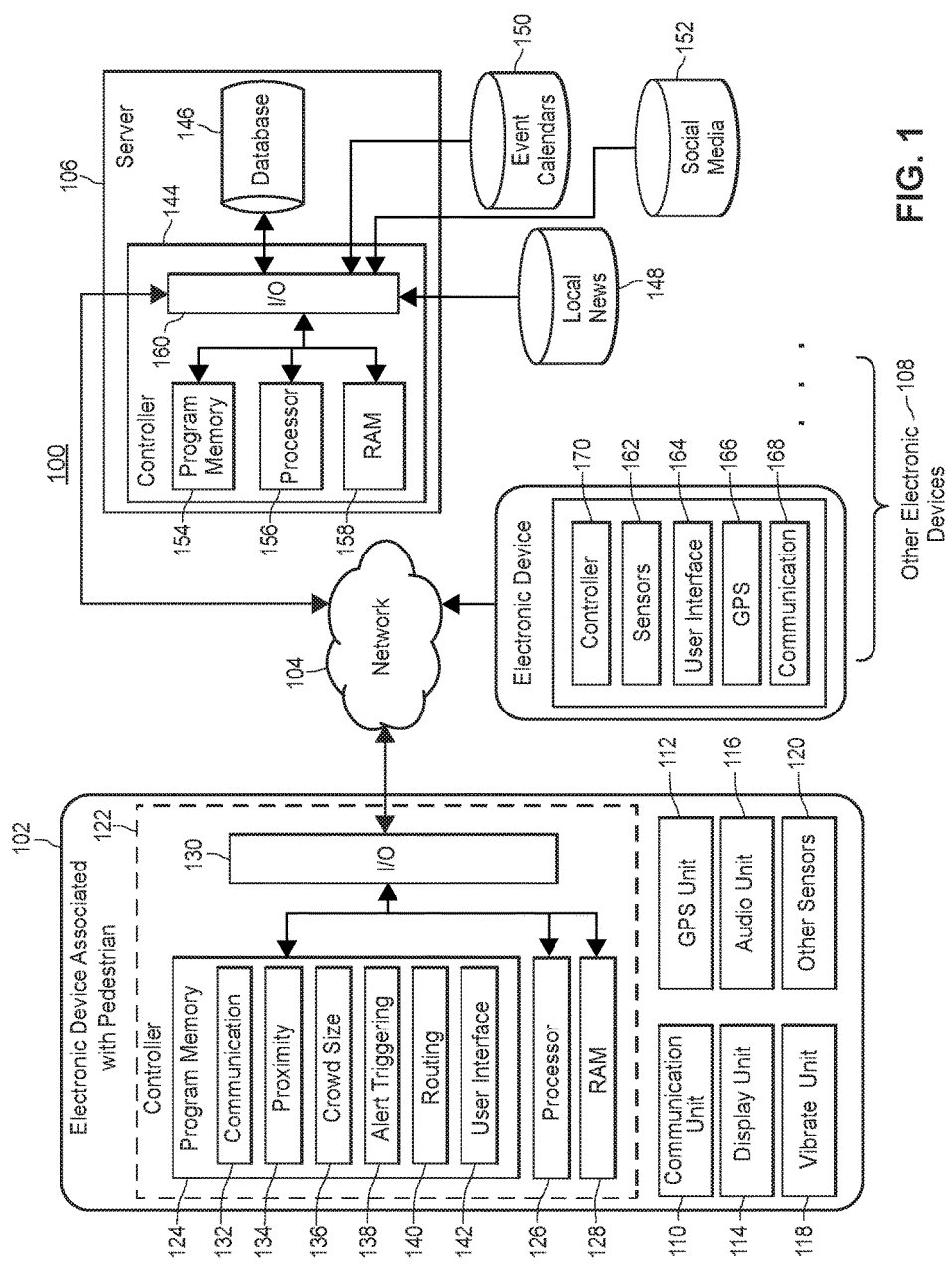
FIG. 1 depicts a block diagram of an exemplary system for alerting a pedestrian of nearby crowd activity or a nearby safety concern.

The present embodiments may relate to, inter alia, alerting a pedestrian of nearby crowd activity or a nearby safety concern. For many pedestrians, it may be desirable to avoid large crowds. Crowds may be intimidating or confusing, and may in some instances block pedestrian walking routes. Additionally, for almost all pedestrians it may be desirable to avoid safety concerns. However, pedestrians may sometimes be distracted or otherwise unaware of crowd activity or safety issues that may be nearby. For instance, a pedestrian may be listening to music, looking at a mobile device, or talking with friends, and may be unaware of his or her surroundings. Accordingly, it may be desirable to alert a pedestrian of nearby crowd activity and nearby safety concerns so that a distracted or unaware pedestrian may become attentive to such nearby crowd activities or nearby safety concerns. An attentive pedestrian may subsequently take steps to avoid the nearby crowd activity or nearby safety concern.

An electronic device associated with the pedestrian may receive an indication of nearby crowd activity or a nearby safety concern. The indication may include the location (e.g., position) of the crowd activity or safety concern, and other relevant details such as, e.g., the size of the crowd or the severity of the safety concern. In response to the indication, the electronic device may trigger an alert configured to notify the pedestrian of the nearby crowd activity or nearby safety concern. Additionally or alternatively, the electronic device may receive an indication of its own current location (e.g., position). In some embodiments, an alert may be triggered only when the crowd activity or safety concern is within close proximity of the pedestrian (e.g., within a certain threshold distance of the current location of the electronic device associated with the pedestrian). Moreover, in some embodiments the alert may be triggered only when the crowd is above a certain threshold size, or the safety concern is above a certain threshold of severity.

Upon noticing the alert, the pedestrian may become less distracted, and may in particular become aware of the nearby crowd activity or safety concern. The pedestrian may then take steps to avoid the nearby crowd activity or safety concern, such as, e.g., moving away from the nearby crowd activity or safety concern, determining a new walking route in order to avoid the location of the nearby crowd activity or safety concern, following a new walking route generated by the electronic device to avoid the nearby crowd activity or safety concern, or generally becoming more aware of his or her surroundings, for instance. As an example, a pedestrian noticing an alert indicating a nearby parade route may wish to take a new walking route to avoid being blocked. As another example, a pedestrian noticing an alert indicating a nearby fire may wish to move away from the location of the fire.

The systems and methods therefore offer numerous benefits. In particular, the systems and methods effectively and efficiently trigger an alert to notify a pedestrian of a nearby crowd activity or nearby safety concern. That is, a pedestrian may be distracted, unaware of his or her surroundings, or otherwise simply unaware of a nearby crowd activity or nearby safety concern. After noticing the alert, the pedestrian may subsequently become aware and proceed accordingly. In this way, the safety of pedestrians may be improved. Moreover, in embodiments, alerts may be triggered in real time, as soon as an indication of a nearby crowd activity or nearby safety concern has been received by an electronic device associated with a pedestrian. This real-time alert triggering may allow a pedestrian to become quickly aware of the current nearby crowd activity or nearby safety concerns, and reduce the time in which the pedestrian who may have been distracted, inattentive, or otherwise unaware, notices the nearby crowd activity or nearby safety concern, and takes action to safely proceed. It should be appreciated that other benefits are envisioned.

Using conventional methods, a nearby crowd activity or nearby safety concern may go unnoticed by distracted or otherwise unaware pedestrians. The systems and methods provided herein offer improved capabilities to solve this problem by dynamically triggering an alert to notify a pedestrian of a nearby crowd activity or nearby safety concerns. Accordingly, a distracted or otherwise unaware pedestrian may notice the alert, which may persist until dismissal by the pedestrian or until the nearby crowd activity or nearby safety concern is no longer within close proximity of the pedestrian, or is no longer above a certain threshold size or severity level. Because the systems and methods described herein employ the collection, analysis, and transmission of data, the systems and methods are necessarily rooted in computer technology in order to overcome the noted shortcomings.

Similarly, the systems and methods provide improvements in a technical field, namely, the safety features of electronic devices with which pedestrians may be associated. Instead of the systems and methods merely being performed by hardware components using basic functions, the systems and methods employ complex steps that go beyond the mere concept of simply retrieving and combining data using a computer. In particular, the various hardware components described herein trigger alerts to notify a pedestrian of a nearby crowd activity or nearby safety concern, among other functionalities.

According to implementations, the systems and methods may support a dynamic, real-time or near-real-time analysis of any captured, received, or detected data. In particular, an electronic device associated with a pedestrian may receive an indication of a nearby crowd activity or nearby safety concern, including its current location or current size/severity, in real-time or near real-time, and may automatically and dynamically trigger an alert to the pedestrian based on, e.g., the proximity of the crowd activity or safety concern to the current location of the pedestrian, and/or the size of the crowd or severity of the safety concern. In this regard, any pedestrian who receives an alert is afforded the benefit of accurate and relevant data, and may, for instance, quickly take steps to react to a nearby crowd activity or nearby safety concern indicated by the alert.

FIG. 1 depicts a block diagram of an exemplary system 100 for alerting a pedestrian (e.g., any individual standing, walking, running, cycling, rollerblading, etc.) of nearby crowd activity or a nearby safety concern. The high-level architecture illustrated in FIG. 1 may include both hardware and software applications, as well as various data communication channels for communicating data between the various hardware and software components, as is described below. In particular, the system 100 may include an electronic device 102 associated with a pedestrian (not shown). The electronic device 102 may communicate (e.g., via a network 104) with a server 106 and/or other electronic devices 108 in order to receive indications of nearby crowd activity and/or nearby safety concerns, and may trigger alerts accordingly to notify the pedestrian of the nearby crowd activity and/or nearby safety concerns.

In general, the electronic device 102 may be, for instance, a general-use personal computer, cellular phone, smart phone, tablet computer, smart watch, wearable electronics, a dedicated pedestrian alert device, or any other suitable mobile device associated with a pedestrian. In some embodiments, the electronic device may be incorporated into a peripheral device of a mobile device associated with the pedestrian, such as, e.g., headphones. The electronic device 102 may include, inter alia, a communication unit 110, a GPS unit 112, a display unit 114, an audio unit 116, a vibrate unit 118, various sensors 120, a user interface (not shown) and/or a controller 122, in various embodiments.

The communication unit 110 may be disposed at the electronic device 102 and may be configured to transmit information to and/or receive information from components (not shown) of the electronic device 102 (such as, e.g., headphones, an associated smart watch, other associated wearable electronics, etc.), the server 106 and/or other electronic devices 108. The communication unit 110 may include one or more wireless transmitters or transceivers operating at any desired or suitable frequency or frequencies. Different wireless transmitters or transceivers may operate at different frequencies and/or by using different protocols, if desired. The communication unit 110 may send and/or receive information via the network 104, such as over one or more radio frequency links or wireless communication channels which support a one or more communication protocol (e.g., GSM, CDMA, LTE, one or more IEEE 802.11 Standards such as Wi-Fi, WiMAX, BLUETOOTH, etc.). Additionally, in some configurations, the communication unit 110 of the electronic device 102 may communicate with components of the electronic device 102, the server 106 and/or other electronic devices 108 directly over a wireless or wired link in a peer-to-peer (P2P) manner which may utilize, for example, a Wi-Fi direct protocol, a BLUETOOTH or other short range communication protocol, an ad-hoc cellular communication protocol, or any other suitable wireless communication protocol.

In particular, the communication unit 110 may receive indications transmitted by the server 106 and/or other electronic devices 108, indicating information related to nearby crowd activity and/or safety concerns, including, e.g., locations of crowd activity and/or safety concerns, sizes of crowds, and/or severities of safety concerns. In some configurations, the communication unit 110 may also communicate with external databases, such as, e.g., databases 148, 150, 152 discussed in greater detail below. Of course, other additional or alternative uses of the communication unit 110 may be envisioned. For instance, the communication unit 110 may additionally or alternatively receive public safety communications indicative of safety concerns, e.g., via a radio link or any of the other types of links discussed above. Additionally, although only one communication unit 110 is shown in FIG. 1, any number of communication units 110 may be included in various configurations. Moreover, in some embodiments one or more communication units 110 may be (or may be disposed at) a separate device (not shown) communicatively and/or operatively connected to the electronic device 102, and/or a component of the electronic device 102.

The GPS unit 112 may be disposed at the electronic device 102 and may collect data indicating the current location of the electronic device 102. This location information may be used, for instance, to determine the proximity of the electronic device 102 to crowd activity and/or safety concerns. Certain alerts may be triggered for the pedestrian with which the electronic device 102 is associated based on the proximity of nearby crowd activity and/or safety concerns (i.e., whether the location of the crowd activity and/or safety concern is within a certain threshold distance of the location of the pedestrian). In some embodiments, such alerts may be ceased when the crowd activity and/or safety concerns are determined to be further away (e.g., outside of a certain threshold distance) from the electronic device 102. In additional or alternative embodiments, location information detected by the GPS unit 112 may be used for mapping and/or routing features of the electronic device 102. For instance, the location information detected by the GPS unit may be configured to generate routes to assist pedestrians walking to various destinations. In some embodiments, when crowd activity and/or safety concerns are nearby, the routing features of the electronic device 102 may re-route the pedestrian to avoid the crowd activity and/or safety concern. Of course, additional or alternative uses of the GPS unit 112 may be envisioned. Additionally, although only one GPS unit 112 is shown in FIG. 1, any number of GPS units 112 may be included in various configurations. Moreover, in some embodiments one or more GPS units 112 may be (or may be disposed at) a separate device (not shown) communicatively and/or operatively connected to the electronic device 102, and/or a component of the electronic device 102.

The display unit 114 may be, e.g., a light or screen of the electronic device 102, which may be configured to display visual alerts to notify a user (e.g., the pedestrian) of the nearby crowd activity and/or safety concern. A visual alert may be, for instance, a light in various colors, a flashing or blinking light, or any other light suitable for notifying the pedestrian of the nearby crowd activity and/or safety concern. In some embodiments, the visual alert may be a verbal or graphical alert displayed on a screen, or some combination of a verbal or graphical alert. For instance, the alert may be words, e.g. "WARNING: Nearby crowd activity detected." In some configurations the words may include information such as the location of the crowd activity and/or safety concern (e.g., at certain cross-streets, in a certain neighborhood, etc.), the proximity (e.g., one mile, one block, 100 feet) of the crowd activity and/or safety concern to the mobile device, a size of the crowd (e.g., a certain number of people), a severity indication of a safety concern (e.g., "YELLOW ALERT") and/or some type of characterization of the crowd activity (e.g., protest, rally, concert, sporting event, etc.) and/or safety concern (e.g., fire, crime, etc.). In embodiments, the alert may vary depending on whether it is related to a nearby crowd activity or a nearby safety concern. In some embodiments the alert may persist until the crowd activity and/or safety concern is no longer nearby or is no longer above a threshold size and/or severity, or until the alert is dismissed by a user (e.g., the pedestrian).

In additional or alternative embodiments, the display unit 114 may also be configured to display route guidance, and/or an interactive user interface through which the electronic device may receive input from the associated user/pedestrian. Of course, other additional or alternative uses of the display unit 114 may be envisioned. Additionally, although only one display unit 114 is shown in FIG. 1, any number of display units 114 may be included in various configurations. Moreover, in some embodiments the display unit 114 may be (or may be disposed at) a separate device (not shown) communicatively and/or operatively connected to the electronic device 102, and/or a component of the electronic device 102.

The audio unit 116 may be, for instance, a speaker disposed at the electronic device 102, and may be configured to sound audible alerts to notify a user (e.g., a pedestrian) of the electronic device 102 of a nearby crowd activity and/or safety concern. In some embodiments, the audio unit 116 may be configured to sound the alert only when a crowd has at least a certain threshold number of people, only when a safety concern is above a threshold severity level, and/or only when the crowd activity and/or safety concern is within close proximity of the electronic device 102. The audio unit 116 may generate various sounds, such as sirens, beeping, music, a continuous tone, etc., to notify the pedestrian of the nearby crowd activity and/or safety concern. In embodiments, the audio alert may vary depending on whether the alert is related to a nearby crowd activity or a nearby safety concern. In some embodiments, for instance, the audio unit 116 may project a voice reading a warning, e.g., "Warning: Crowd activity nearby." or "Warning: Safety concern nearby." In some embodiments, the warning may further include indications of, e.g., the location of the crowd activity and/or safety concern, the proximity of the crowd activity and/or safety concern to the electronic device 102, the size of the crowd, the severity of the safety concern, and/or an indication of the type of crowd activity and/or type of safety concern. Of course, the audio unit 116 may generate additional or alternative sounds or words, or any combination of the various sounds discussed above for various alerts. In some embodiments the alert may persist until the crowd activity and/or safety concern is no longer nearby or is no longer above a threshold size and/or severity, or until the alert is dismissed by a user (e.g., the pedestrian).

Of course, other additional or alternative uses of the audio unit 116 may be envisioned. Additionally, although only one audio unit 116 is shown in FIG. 1, any number of audio units 116 may be included in various configurations. Moreover, in some embodiments the audio unit 116 may be (or may be disposed at) a separate device (not shown) communicatively and/or operatively connected to the electronic device 102, and/or a component of the electronic device 102.

The vibrate unit 118 may be disposed at the electronic device 102, and may be configured to generate vibration alerts to notify a user (e.g., a pedestrian) of the electronic device 102 of a nearby crowd activity and/or safety concern. In some embodiments, the vibrate unit 118 may be configured to vibrate only when a crowd has at least a certain threshold number of people, only when a safety concern is above a threshold severity level, and/or only when the crowd activity and/or safety concern is within close proximity of the electronic device 102. In embodiments, the vibration alert may vary depending on whether the alert is related to a nearby crowd activity or a nearby safety concern. In some embodiments the alert may persist until the crowd activity and/or safety concern is no longer nearby or is no longer above a threshold size and/or severity, or until the alert is dismissed by a user (e.g., the pedestrian). Of course, other additional or alternative uses of the vibrate unit 118 may be envisioned. Additionally, although only one vibrate unit 118 is shown in FIG. 1, any number of vibrate units 118 may be included in various configurations. Moreover, in some embodiments one or move vibrate unit 118 may be (or may be disposed at) a separate device (not shown) communicatively and/or operatively connected to the electronic device 102, and/or a component of the electronic device 102. Additionally, while in some embodiments the electronic device 102 may include one or more of a display unit 114, an audio unit 116 and/or a vibrate unit 118 configured to generate various alerts (including alerts combining features of one or more of the units 114, 116, 118), in other embodiments the electronic device 102 may include just one of the units 114, 116, 118 configured to generate alerts, or may generate alerts in an entirely different manner.

The various sensors 120 may be disposed at the electronic device 102 and may collect data such as indications of alert dismissals by the user (e.g., pedestrian). For instance, the various sensors 120 may include image sensors configured to detect a motion or gesture of the user indicating dismissal. As another example, the various sensors 120 may include a microphone configured to detect a voice command of a user, indicating dismissal or indicating some other instruction for the electronic device 120. Of course, other additional or alternative types of sensors 120 and/or uses of the various sensors 120 may be envisioned. For instance, the sensors may be configured to receive other user input in addition to user dismissals. Additionally, although only one sensor 120 is shown in FIG. 1, any number of various sensors 120 may be included in various configurations. Moreover, in some embodiments one or more of the various sensors 120 may be (or may be disposed at) a separate device (not shown) communicatively and/or operatively connected to the electronic device 102, and/or a component of the electronic device 102.

In some embodiments, a user interface (not shown) may be disposed at the electronic device 102 and may be configured to receive inputs, selections, or preferences from a user (e.g., the pedestrian). For instance, the user interface may be configured to receive input from the pedestrian indicating, e.g., whether or not alerts are desired and/or what types of alerts are desired. Additionally, the user interface may be configured to receive input from the pedestrian indicating various threshold values for triggering the alert, such as a threshold distance of the crowd or safety concern, a threshold size or density of a crowd, a threshold severity of a safety concern, etc. Furthermore, the user interface may be configured to receive pedestrian selections or preferences for when to receive alternate route guidance (e.g., every time an alert is generated, only some of the time, or none of the time). Of course, the user interface may receive additional or alternative types of inputs, selections, and preferences in some embodiments. Additionally, any number of user interfaces may be included in various configurations. In some embodiments one or more of the user interfaces may be (or may be disposed at) a separate device (not shown) communicatively and/or operatively connected to the electronic device 102, and/or at components of the electronic device 102.

The controller 122 may include a program memory 124, various processors (e.g., microprocessors) 126, RAM 128, and an I/O circuit 132, all of which may be interconnected via an address/data bus. The program memory 124 may include an operating system (not shown), a data storage (not shown), and/or a plurality of various software applications 132, 134, 136, 138, 140, 142. The operating system (not shown), for example, may include one of a plurality of general purpose or mobile platforms, such as the Android™, iOS®, or Windows® systems, developed by Google Inc., Apple Inc., and Microsoft Corporation, respectively. Alternatively, the operating system may be a custom operating system designed for triggering alerts for pedestrians based on nearby crowd activity and/or nearby safety concerns. The data storage (not shown) may include data such as user profiles and preferences, application data and/or routine data for the applications 132, 134, 136, 138, 140, 142, and/or other data related to communication features and/or pedestrian alert features. In some embodiments, the controller 122 may also include, or otherwise be communicatively connected to, other data storage mechanisms.

In embodiments, the controller 122 may include multiple program memories 124, processors 126 and/or RAMs 128. Moreover, although FIG. 1 depicts the I/O circuit 130 as a single block, the I/O circuit 130 may include a number of different types of I/O circuits. The controller 122 may implement the program memories 124 and/or the RAMs 128 as semiconductor memories, magnetically readable memories, or optically readable memories, for example. Generally speaking, the program memories 124 and/or the RAMs 128 may respectively include one or more non-transitory, computer-readable storage media. The one or more processors 126 may be adapted and configured to execute any of the various software applications 132, 134, 136, 138, 140, 142 residing in the program memory 124, in addition to other software applications/routines.

Generally speaking, the applications 132, 134, 136, 138, 140, 142 may perform one or more functions related to, inter alia, triggering alerts to notify pedestrians of nearby crowd activity and/or nearby safety concerns, and/or communications between the electronic device 102 and external sources, such as, e.g., components of the electronic device 102, the server 106 and/or other electronic devices 108. For example, one or more of the applications 132, 134, 136, 138, 140, 142 may perform at least a portion of any of the methods described herein, such as, e.g., method 200 and/or method 300.

The various software applications may include one or more of, for example, a communication application 132 for transmitting and receiving information (e.g., indications of crowd activity and/or safety concerns, indications of locations of crowd activity and/or safety concerns, indications of crowd size, and/or indications of safety concern severity, etc.) to and from external sources, such as, e.g., external servers 106 and/or other electronic devices 108; a proximity application 134 for analyzing the current location of the electronic device and the location of the crowd activity and/or safety concern to determine whether a received location of the crowd activity and/or safety concern is within close proximity of the current location of the electronic device 108; a crowd size application 136 for determining whether a received size of the crowd is greater than a certain threshold number of people; an alert triggering application 138 for triggering an alert (e.g., via the display unit 114, audio unit 116, and/or vibrate unit 118) for the pedestrian when a safety concern is within a close proximity of the electronic device 102 and/or when a crowd activity is within a close proximity of the electronic device 102 and greater than a certain threshold size; a routing application 140 for generating a route for the pedestrian to avoid the crowd activity and/or safety concern; and/or a user interface application 142 for receiving inputs, selections, and/or preferences from a user, e.g., the pedestrian with which the electronic device 102 is associated. Of course, this is not an exhaustive list of possible software applications of the program memory 124, and various embodiments and configurations may include additional and/or alternative applications. Moreover, in additional or alternative embodiments, any of the applications herein described as being processed by the electronic device 102 may be processed by the server 106, or vice versa.

As discussed above, the electronic device 102 may communicate with an external server 106. The external server 106 may in some embodiments include multiple servers 106. The server or servers 106 may include a controller 144 that may be connected to one or more databases 146, 148, 150, 152 via a link. Although as depicted in FIG. 1, the database 146 appears to be connected to the controller 144 via a local link, while the local news database 148, event calendar database 150, and social media database 152 appear to be connected to the controller 144 via a remote link, in various embodiments any of these databases may be connected to the controller 144 via a remote or a local link. Moreover, in additional or alternative embodiments, any of the databases described herein may be connected directly to the electronic device 102.

The database 146 may be adapted to store data related to, for instance, crowd activity and/or safety concern identification features, pedestrian alert features, communication features, and/or routing/mapping features. The local news database 148 may be adapted to store local news information, including locations and/or sizes of crowds and/or locations and/or severity of safety concerns. The local news database 148 may be updated in real time as such information is aired and/or published by news outlets. The event calendar database 150 may be adapted to store calendars related to local events, including, e.g., sports schedules, movie schedules, play and/or opera schedules, museum exhibit schedules, concert schedules, festival schedules, protest and/or rally schedules, local holiday schedules, etc. These calendars may include dates and/or times of these events, and may additionally include a projected number of people attending, e.g., based on previous years' attendance, or based on tickets sold, as a few examples. The event calendar database 150 may be updated in real time as events are scheduled. The social media database 152 may include indications of popular upcoming events (e.g., as indicated by a certain number of online RSVPs, and/or as indicated by a certain number of "likes", "shares" or other social media metric, for instance), indications of popular locations based on, e.g., photo tags and/or "check-ins" at certain locations, or other social media data related to crowd activity and/or safety concerns. The social media database 152 may be updated in real time, e.g., as social media posts and/or events are published. The databases 146, 148, 150, 152 may be maintained by third parties in some embodiments.

It should be noted that, while not shown, additional databases may be linked to the controller 144 in a known manner. For instance, public safety databases, including, e.g., databases maintained by law enforcement agencies, fire departments, hospitals, public health agencies, and/or correctional facilities may also be linked to the controller 144. Such public safety databases may include indications of safety concerns such as, e.g., reported fires, 911 calls indicating crimes which may be in progress, traffic accidents, reported flash mobs, reports of escaped inmates, and the locations of such concerns, which may be updated in real time. Of course, additional and/or alternative public safety databases including additional or alternative indications of safety concerns may be linked to the controller 144 in additional or alternative embodiments.

The controller 144 may include one or more program memories 154, one or more processors 156 (which may be, e.g., microcontrollers and/or microprocessors), one or more random-access memories (RAMs) 158, and/or an input/output (I/O) circuit 160, all of which may be connected via an address/data bus. The server 106 may further include a number of various software applications (not shown) stored in the program memory 154. Generally speaking, the applications may perform one or more functions related to determining indications of crowd activity and/or safety concerns and their proximity, size, and/or severity, communicating with the electronic device 102, network 104, and/or various databases 146, 148, 150, 152, and/or triggering/generating various alerts for a pedestrian associated with the electronic device 102. For example, one or more of the applications may perform at least a portion of any of the methods described herein, such as, e.g., methods 200 or 300.

The various software applications may include, for example, an application for determining a size, location, and/or a severity of nearby crowd activity and/or a nearby safety concern using data obtained from various databases 146, 148, 150, 152; a real-time communication application for communicating indications of sizes, locations, and/or severity of nearby crowd activity and/or safety concerns to the electronic device 102; an application for triggering and/or generating alerts for the pedestrian based on nearby crowd activity and/or nearby safety concerns; and/or an application for transmitting routing/mapping information to the electronic device 102, etc. Of course, this is not an exhaustive list of the applications, and various embodiments and configurations may include additional and/or alternative applications. Moreover, it will be understood that there may be any number of software applications. Additionally, the various software applications may be executed on the same computer processor 156 or on different computer processors. Further, two or more of the various applications may be integrated as a combined application, if desired. In additional or alternative embodiments, any of the applications herein described as being processed by the server 106 may be processed by the electronic device 102, or vice versa.

It should be appreciated that although the server 106 is illustrated as a single device in FIG. 1, one or more portions of the server 106 may be implemented as one or more storage devices that are physically co-located with the server 106, or as one or more storage devices utilizing different storage locations as a shared database structure (e.g. cloud storage). In some embodiments, the server 106 may be configured to perform any suitable portion of the processing functions remotely that have been outsourced by the electronic device 102. In such embodiments, the server 106 may receive and process data and send an indication to the electronic device 102, and/or take other actions.

Moreover, although only one processor 156 is shown, the controller 144 may include multiple processors 156. Similarly, the memory of the controller 144 may include multiple program memories 154 and multiple RAMs 158. Although the I/O circuit 160 is shown as a single block, it should be appreciated that the I/O circuit 160 may include a number of different types of I/O circuits. The program memory 154 and RAM 158 may be implemented as semiconductor memories, magnetically readable memories, optically readable memories, or biologically readable memories, for example. Generally speaking, the program memory 154 and/or the RAM 158 may respectively include one or more non-transitory, computer-readable storage media. The controller 144 may also be operatively connected to the network 104 via a link.

As discussed above, in some embodiments the electronic device 102 may additionally or alternatively communicate with other electronic devices 108. Like the electronic device 102, one or more of the electronic devices 108 may be, for instance, general-use computers, cellular phones, smart phones, tablet computers, smart watches, wearable electronics, or any other suitable mobile devices. Although only one other electronic device 108 is shown in FIG. 1, any number of other electronic devices 108 may be included in various embodiments. The other electronic devices 108 may be associated with other pedestrians (not shown), and may in some embodiments be configured to transmit indications of nearby crowd activity and/or safety concerns to the electronic device 102 or components of the electronic device 102, and/or to the server 106, e.g., via the network 104.

The other electronic devices 108 may each include, inter alia, one or more various sensors 162, user interfaces 164, GPS units 166, communication units 168, and/or controllers 170. Of course, in various embodiments the electronic devices 108 may include additional or alternative features. Moreover, some of the electronic devices 108 may include different features than other of the electronic devices 108.

Various sensors 162 may be disposed at one or more of the electronic devices 108 and may be configured to collect data indicative of nearby crowd activity and/or safety concerns. For instance, the various sensors 162 may include image sensors configured to detect images indicative of a crowd (e.g., many people) and/or a safety concern (e.g., fire), and/or audio sensors configured to detect sounds indicative of a crowd (e.g., many voices) and/or a safety concern (e.g., sirens or alarms). Of course, other additional or alternative ways for the various sensors 162 to collect data indicative of nearby crowd activity and/or safety concerns may be envisioned. Moreover, additional and/or alternative uses for the various sensors 162 may be envisioned as well. Additionally, although only one sensor 162 is shown in FIG. 1, any number of sensors 162 may be included in various configurations. In some embodiments one or more of the various sensors 162 may be (or may be disposed at) separate devices (not shown) communicatively and/or operatively connected to the electronic devices 108, and/or at components of the electronic devices 108.

User interfaces 164 may be disposed at one or more of the electronic devices 108 and may be configured to collect user input indicative of nearby crowd activity and/or safety concerns. For instance, a user (e.g., associated pedestrian) of an electronic device 108 may input an indication of a nearby crowd or nearby safety concern detected by the user. The user input may include, for instance, a user estimate of the location and/or the proximity of the crowd or safety concern, the number of people in a crowd, and/or severity of a safety concern. Moreover, additional and/or alternative uses for the user interfaces 164 may be envisioned as well. Additionally, although only one user interface 164 is shown in FIG. 1, any number of user interfaces 164 may be included in various configurations. In some embodiments one or more of the user interfaces 164 may be (or may be disposed at) separate devices (not shown) communicatively and/or operatively connected to the electronic devices 108, and/or at components of the electronic devices 108.

GPS units 166 may be disposed at one or more of the electronic devices 108 and may be configured to detect the current locations of the electronic devices 108 with which they are associated. In some embodiments, the locations of each of the electronic devices 108, as indicated by GPS units 166, may be transmitted to the electronic device 102 and/or the server 106, and the various locations of electronic devices 108 may be analyzed to determine whether the locations indicate crowd activity. For instance, a certain number of electronic devices 108 clustered in a certain area may indicate a crowd activity in that area. In additional or alternative embodiments, the location of an electronic device 108 may be combined with information detected by the various sensors 162 and/or input detected by user interfaces 164 in order to determine the location of a crowd activity and/or safety concern. For instance, an image sensor 162 may detect an image indicative of crowd activity. By combining the image indicative of crowd activity with the location information detected by the GPS unit 166, an indication of crowd activity and its location may be determined. As another example, a user with which the electronic device 108 is associated may input an indication of a nearby safety concern but in some embodiments may not input an indication of the location of the nearby safety concern. By combining the indication of the nearby safety concern with the location information detected by the GPS unit 166, an indication of a safety concern and its location may be determined. Of course, additional and/or alternative uses for the GPS units 166 may be envisioned as well. Additionally, although only one GPS unit 166 is shown in FIG. 1, any number of GPS units 166 may be included in various configurations. In some embodiments one or more of the GPS units 166 may be (or may be disposed at) separate devices (not shown) communicatively and/or operatively connected to the electronic devices 108, and/or at components of the electronic devices 108.

Communication units 168 may be disposed at one or more of the electronic devices 108 and may be configured to transmit information to and/or receive information from electronic device 102, and/or the server 106. The communication units 168 may include one or more wireless transmitters or transceivers operating at any desired or suitable frequency or frequencies. Different wireless transmitters or transceivers may operate at different frequencies and/or by using different protocols, if desired. The communication units 168 may send and/or receive information via the network 104, such as over one or more radio frequency links or wireless communication channels which support a one or more communication protocol (e.g., GSM, CDMA, LTE, one or more IEEE 802.11 Standards such as Wi-Fi, WiMAX, BLUETOOTH, etc.). Additionally, in some configurations, the communication units 168 of the electronic devices 108 may communicate with the electronic device 102 and/or the server 106 directly over a wireless or wired link in a peer-to-peer (P2P) manner which may utilize, for example, a Wi-Fi direct protocol, a BLUETOOTH or other short range communication protocol, an ad-hoc cellular communication protocol, or any other suitable wireless communication protocol.

In particular, the communication units 168 may transmit indications to the electronic device 102 and/or the server 106 indicating information related to nearby crowd activity and/or safety concerns, including, e.g., locations of crowd activity and/or safety concerns, sizes of crowds, and/or severity of safety concerns. Of course, other additional or alternative uses of the communication units 168 may be envisioned. Additionally, although only one communication unit 168 is shown in FIG. 1, any number of communication units 168 may be included in various configurations. Moreover, in some embodiments one or more of the communication units 168 may be (or may be disposed at) separate devices (not shown) communicatively and/or operatively connected to the electronic devices 108, and/or at components of the electronic devices 108.

The controllers 170 of the electronic devices 108 may include one or more program memories (not shown), one or more processors (not shown) one or more RAMs (not shown), and/or an input/output (I/O) circuit (not shown), all of which may be connected via an address/data bus. Furthermore, a number of various software applications (not shown) may be stored in the program memory. Generally speaking, the applications may perform one or more functions related to determining indications of crowd activity and/or safety concerns and their locations, sizes, and/or severities, and/or communicating with the electronic device 102, network 104, and/or server 106. For example, one or more of the applications may perform at least a portion of any of the methods described herein, such as, e.g., methods 200 or 300.

In embodiments, the controller 170 may include multiple program memories, processors and/or RAMs, and the I/O circuit may include a number of different types of I/O circuits. The controller 170 may implement the program memories and/or the RAMs as semiconductor memories, magnetically readable memories, or optically readable memories, for example. Generally speaking, the program memories and/or the RAMs may respectively include one or more non-transitory, computer-readable storage media. The one or more processors may be adapted and configured to execute any of the various software applications residing in the program memory, in addition to other software applications/routines.

The various software applications of the electronic devices 108 may include, for example, an application for determining a size, location, and/or a severity of nearby crowd activity and/or a nearby safety concern using data obtained from, for instance, various sensors 162, user interfaces 164, and/or GPS units 166; and/or a real-time communication application for communicating indications of sizes, locations, and/or severity of nearby crowd activity and/or safety concerns to the electronic device 102, a component of the electronic device 102 and/or the server 106. Of course, this is not an exhaustive list of the possible applications of the electronic device 108, and various embodiments and configurations may include additional and/or alternative applications. Moreover, it will be understood that there may be any number of software applications included in various configurations. Additionally, the various software applications may be executed on the same processor or on different processors. Further, two or more of the various applications may be integrated as a combined application, if desired. Moreover, in additional or alternative embodiments, any of the applications herein described as being processed by the electronic devices 108 may be processed by the electronic device 102 and/or by the server 106.

Figure 2:
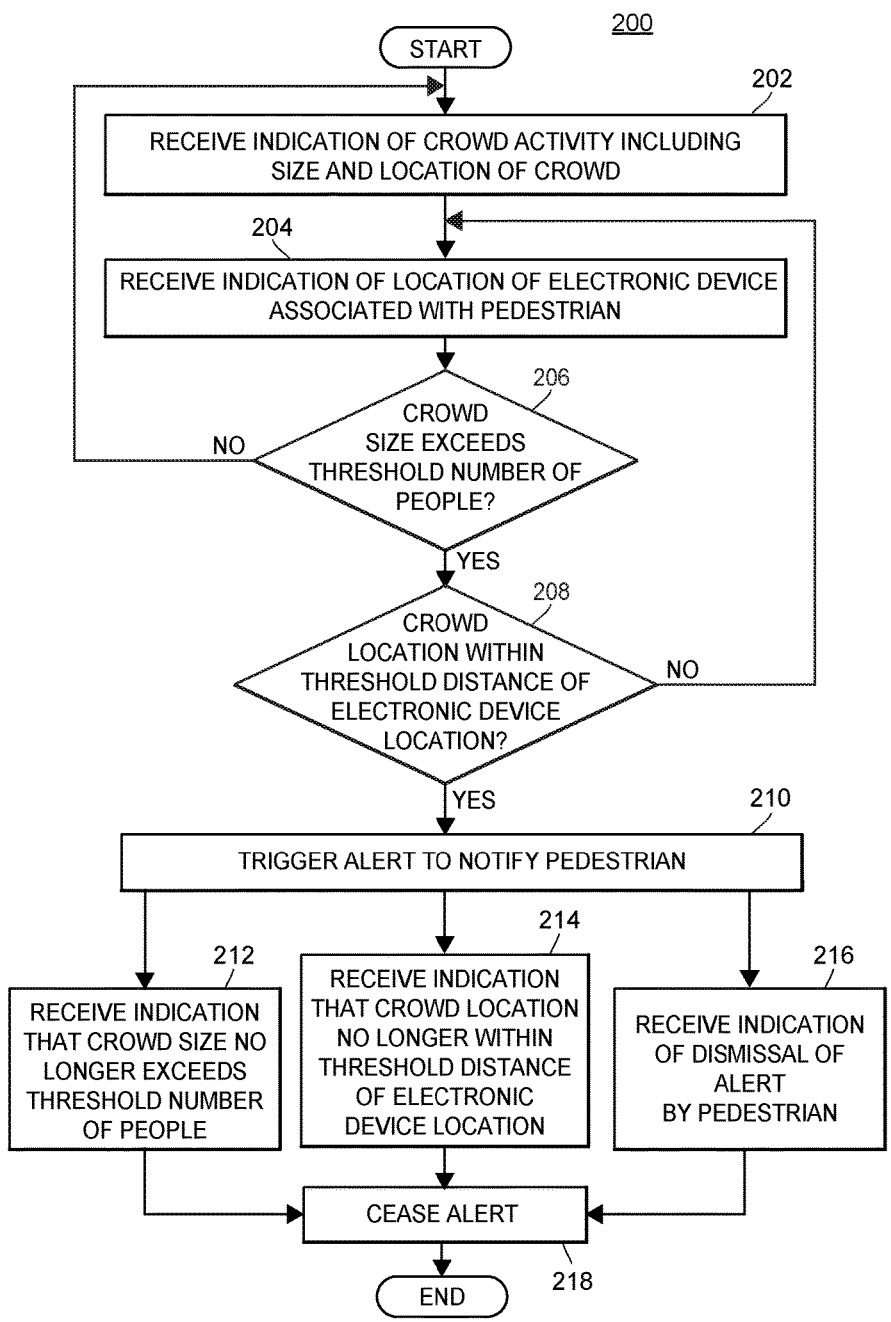
FIG. 2 depicts a flow diagram of an exemplary method for alerting a pedestrian of nearby crowd activity.

FIG. 2 depicts a flow diagram of an exemplary method 200 for alerting a pedestrian of nearby crowd activity. Method 200 may be facilitated by an electronic device (e.g., electronic device 102) associated with the pedestrian which may support execution of a dedicated application that may facilitate the functionalities of the method 200. Further, the electronic device may enable a user to make various selections and facilitate various functionalities.

At block 202, an indication of crowd activity may be received and/or requested. The indication of crowd activity may include an indication of the location of the crowd activity, the date and/or time of the crowd activity (which may be a current date and/or time, or an upcoming date and/or time), and/or an actual or estimated number of people who may be part of the crowd. In some embodiments, the indication of crowd activity may be based on real-time data. The real-time crowd data may include, e.g., location data and/or any other kind of sensor data collected by a number of other electronic devices (e.g., other electronic devices 108) configured to communicate with the electronic device associated with the pedestrian. For instance, each electronic device may transmit location data to a central server which may be configured to detect clusters of users (e.g., as indicated by the locations of user electronic devices) in particular locations. In some instances, such clusters of users may indicate crowd activity at the current time in the particular locations. In additional or alternative embodiments, the other electronic devices may transmit sensor data and/or user interface data which may be indicative of crowd activity and/or safety concerns in close proximity to other electronic devices, as well as GPS data indicating the locations of the other electronic devices. In this way, the transmitted information may indicate by proxy a real-time location of an indication of crowd activity.

Additionally or alternatively, the real-time crowd data may include social media postings. Social media posting may be, for instance, stored in a database (e.g., social media database 152) which may be updated in real-time and may be, for instance, accessed by the electronic device, or accessed by a server and transmitted to the electronic device. As one example, some events may include a social media posting or event web page where attendees may "check-in" and indicate their attendance. As another example, various social media postings may include location "tags" indicating the location where a photo was uploaded, or indicating a location where a photo was taken, as well as a time of posting. Based on a number of real-time social media check-ins and/or location-tagged posts, an estimate for a number of people concentrated in a particular area or at a particular event may be determined, indicating crowd activity. In some embodiments, updates of the crowd activity may be received periodically or constantly.

As another example, real-time crowd data may include news reports and/or alerts. Like the social media postings, the local news reports and/or alerts may be for instance, stored in a database (e.g., local news database 148) which may be updated in real-time and may be, for instance, received from the database by the electronic device, or accessed by a server and transmitted to the electronic device. News reports may include coverage of rallies, protests, or other events involving large numbers of people, and may include real-time estimates of the location and/or number of people at an event. Local news reports may be received and/or accessed in real-time, and/or as soon as they are aired or published.

In some embodiments, the indication of crowd activity may be based on an upcoming event. For instance, various event calendars (e.g., sporting event schedules, concert calendars, museum exhibit dates, government holiday calendars, festival dates, etc.) may be accessed (e.g., via event calendar database 150) indicating upcoming events in a particular area. Scheduled events may include a scheduled location (e.g., a particular concert hall, or sports arena) and a scheduled date and time for an event. An estimated number of people attending an event may be determined in various possible ways, including, for instance, number of tickets purchased, size of the venue (e.g., number of people may correspond to number of seats), attendance in previous years, etc.

In additional or alternative embodiments, the indication of crowd activity for an upcoming event may be based on the popularity of a social media event post (accessed and/or received via, e.g., a social media database 152) including, inter alia, a date, time and/or a location of the upcoming event. "Popularity" may be indicated by, for instance, online RSVPS, "views," "likes," "follows," "retweets," "comments," or any suitable other metric of social media popularity. For instance, a post with a number of likes greater than a certain threshold number (e.g., 1000 likes) may be considered a popular post. Moreover, social media popularity metrics such as RSVPs, views, likes, follows, retweets, comments, etc. may in some embodiments be a proxy for the size of the crowd. That is, a certain level of social media popularity may translate to a projected number of people in the crowd at the time and location indicated by the event. Of course, a number of likes, for instance, may not directly correspond to a number of attendees for an actual event, but in some embodiments the number of likes or other social media metric may be scaled to determine an estimated number of attendees. As an example, a social media post indicating the date, time, and location of a rally may receive 10,000 likes, which may, for instance, scale to an estimated 5,000 attendees.

At block 204, an indication of a current location of an electronic device associated with the pedestrian may be received. The indication of the current location may be, for instance, GPS coordinates generated by a GPS module of the electronic device. In additional or alternative embodiments, the pedestrian may input a current location, e.g., via a user interface of the electronic device.

At block 206, a query may be made as to whether the crowd size of the indicated crowd activity exceeds a threshold number of people. The threshold number of people (e.g., 100 people, 1,000 people, 10,000 people, etc.) in the crowd may be selected by the pedestrian. If the crowd size does not exceed the threshold number of people (block 206, NO), an indication of crowd activity, including the size and location of the crowd may be again received (e.g., at block 202) and/or requested, and the method may proceed accordingly.

In some embodiments, the next indication of crowd activity may be received and/or requested immediately after the determination that the crowd size does not exceed the threshold number of people (block 206, NO). In other embodiments, the next indication of crowd activity may be received and/or requested periodically (e.g., every minute, or every five seconds).

If the crowd size is determined to exceed the threshold number of people (block 206, YES), a query may be made as to whether the crowd location is within a threshold distance of the current location of the electronic device associated with the pedestrian (block 208). The threshold distance (e.g., 100 feet, one block, one mile, etc.) may be selected by the pedestrian in some embodiments, or may be preset. If the crowd location is not within the threshold distance of the current location of the electronic device, (block 208, NO), an indication of the current location of the electronic device associated with the pedestrian may be again received (e.g., at block 204) and/or requested, and the method may proceed accordingly. In some embodiments, the next indication of current electronic device location may be received and/or requested immediately after the determination that the crowd location is not within the threshold distance of the current location of the electronic device (block 208, NO). In other embodiments, the next indication of electronic device location may be received and/or requested periodically (e.g., every minute, or every five seconds). In additional or alternative embodiments, an indication of the current location of the crowd activity may be again received (e.g., at block 202), and the method may proceed accordingly.

If the crowd location is determined to be within the threshold distance of the current location of the electronic device (block 208, YES), an alert may be triggered to notify the pedestrian of the crowd activity (block 210). That is, in some embodiments, the alert may be triggered only when both the size of the crowd exceeds a threshold number of people (e.g., block 206, YES) and the location of the crowd is within a certain threshold distance of the current location of the electronic device (e.g., block 208, YES). The triggered alert may be one or more of a sound, vibration, light, or user interface display of the electronic device, or a combination of the foregoing, or any other suitable alert configured to notify the pedestrian. Moreover, the triggered alert may include an indication of the size of the crowd (e.g., number of people), location of the crowd activity, and/or proximity of the crowd activity (e.g., the distance between the crowd activity and the electronic device associated with the pedestrian).

Additionally or alternatively, in some embodiments, a walking route for the pedestrian may be generated to assist the pedestrian in avoiding the location of the crowd. The walking route may be, for instance displayed via a user interface (e.g., of the electronic device). In some embodiments, the walking route may be added to existing route guidance, e.g., as an update to a route created before the indication of the crowd activity was received.

At block 212, an indication may be received and/or determined, indicating that the size of the crowd no longer exceeds the threshold number. The indication may be received from any of the sources from which the original indication of the size of the crowd was received, or, in some embodiments, from a different source. Moreover, the indication may be based on receiving and/or requesting periodic (e.g., every minute, every five seconds) or continuous updates of the size of the crowd.

Additionally or alternatively, an indication may be received and/or determined indicating that the location of the crowd is no longer within a certain threshold distance from the current location of the electronic device (block 214). The indication may be received from any of the sources from which the original indication of the location was received, or, in some embodiments, from a different source. Moreover, the indication may be based on periodic (e.g., every minute, every five seconds) or continuous updates of the current location of the electronic device associated with the pedestrian. For instance, the pedestrian may have walked away from the crowd, and the location of the crowd may no longer be within the certain threshold distance from the current location of the electronic device associated with the pedestrian. Additionally or alternatively, the indication may be based on periodic or continuous updates of the location of the crowd. For instance, if the crowd is in motion (e.g., a parade, a march, etc.), the new location of the crowd may no longer be within the certain threshold distance from the current location of the electronic device associated with the pedestrian.

Further additionally or alternatively, an indication may be received indicating a dismissal of the alert by the pedestrian (block 216). A dismissal of the alert may be received, e.g., via a user interface of the electronic device associated with the pedestrian. In additional or alternative embodiments, a dismissal of the alert may be detected by one or more sensors disposed at the electronic device (e.g., a microphone may detect a voice dismissal, an image sensor may detect a gesture dismissal, etc.)

At block 218, the alert may be ceased, e.g., based on one or more of the indication that the size of the crowd no longer exceeds the threshold number (at block 212), the indication that the location of the crowd is no longer within the certain threshold distance of the current location of the electronic device (at block 214), and/or the indication of the dismissal by the pedestrian (at block 216). In additional or alternative embodiments, the alert may be ceased based on an indication that an event is scheduled to be over at a particular time. That is, as one example, an alert may be generated for pedestrians within one mile of a sporting arena during the duration of a scheduled game, but may cease when the game is scheduled to end.

Figure 3:
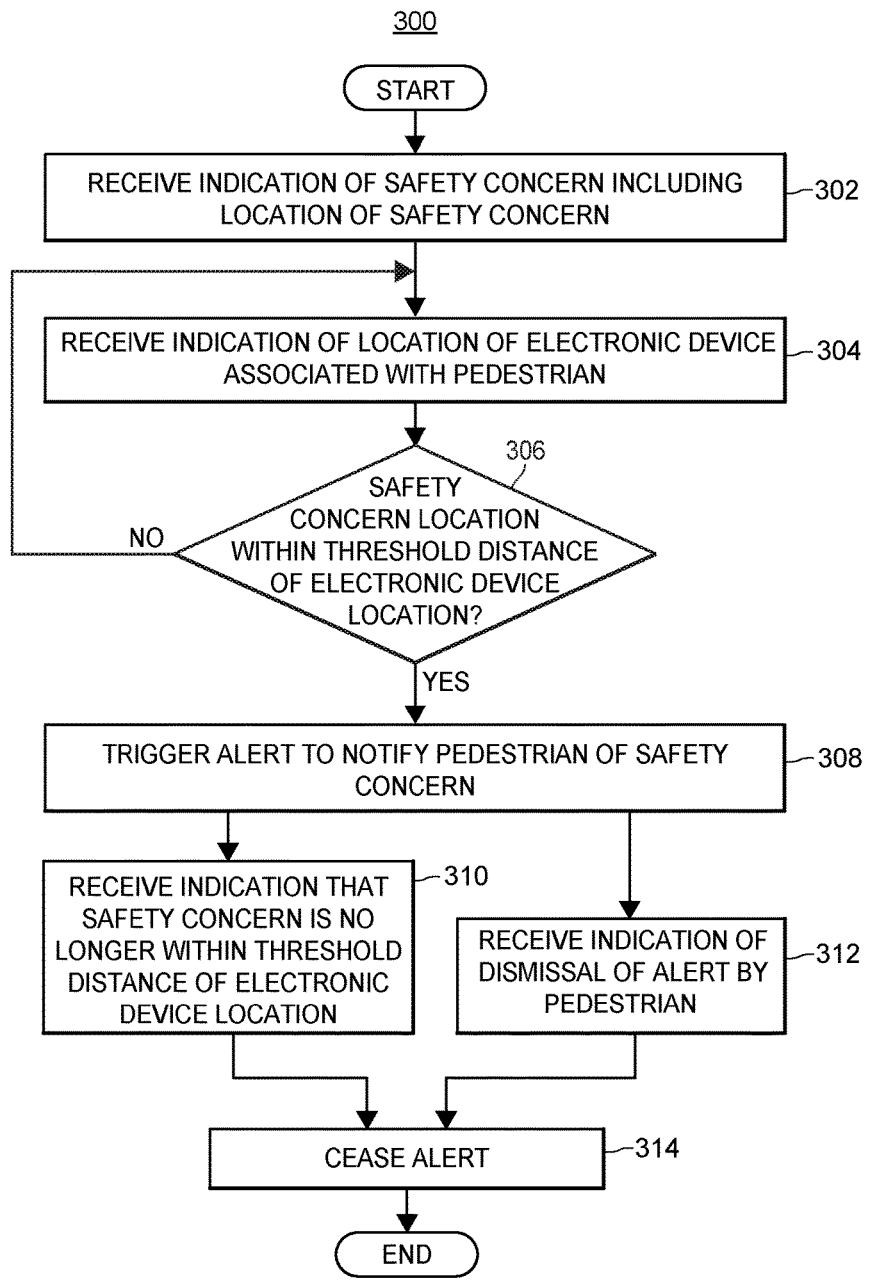
FIG. 3 depicts a flow diagram of an exemplary method for alerting a pedestrian of a nearby safety concern.

FIG. 3 depicts a flow diagram of an exemplary method 300 for alerting a pedestrian of a nearby safety concern. Method 300 may be facilitated by an electronic device associated with the pedestrian (e.g., electronic device 102) which may support execution of a dedicated application that may facilitate the functionalities of the method 300. Further, the electronic device may enable a user to make various selections and facilitate various functionalities.

At block 302, an indication of a safety concern may be received and/or requested. The indication of the safety concern may include the current location of the safety concern. In some embodiments, the indication of the safety concern may also include the severity of the safety concern. For instance, a public safety communication indicating a safety concern may be received by an electronic device associated with the pedestrian. The safety concern may be, for instance, a crime in progress, a fire in progress, a construction in progress, a traffic accident, or a path-blocking obstacle, as a few examples. In some embodiments, the indication of the safety concern may be based on real-time safety data. The real-time safety data may be detected and/or transmitted by a number of other electronic devices (e.g., electronic devices 108) in communication with the electronic device associated with the pedestrian. For instance, an audio sensor (e.g., sensor 162) of one of the other electronic devices may detect a siren noise, which may indicate that there is a nearby fire or crime in progress. As another example, an image sensor (e.g., sensor 162) of one of the other electronic devices may detect an image which may indicate a fire. Additionally, the other electronic devices may include GPS units (e.g., GPS units 166) configured to detect the location of the electronic devices. By combining indications of safety concerns detected by sensors with location information detected by GPS units, the other electronic devices may determine a possible safety concern and a location for the safety concern.

In other configurations, a user of one of the other electronic devices may notice a nearby safety concern and may input, via a user interface (e.g., user interface 164) of one of the other electronic devices, an indication of the nearby safety concern and/or the location of the nearby safety concern. These detected and/or observed indications of safety concerns and their locations may accordingly be transmitted from the other electronic devices to the electronic device associated with the pedestrian, which electronic device may receive the indication of the safety concern and/or its location and proceed accordingly.

As another example, the real-time safety data may be accessed and/or received by the electronic device associated with the pedestrian via a safety database updated in real time (e.g., by local police, local fire department, local hospital, etc.). Updates of the status of a safety concern may be received and/or requested by the electronic device associated with the pedestrian periodically (e.g., every minute, every five seconds) or constantly.

At block 304, an indication of the current location of the electronic device associated with the pedestrian may be received. The indication of the current location may be, for instance, GPS coordinates detected by a GPS unit (e.g., GPS unit 112) of the electronic device. In additional or alternative embodiments, the pedestrian may input a location, e.g., via a user interface of the electronic device. At block 306, a query may be made as to whether the location of the safety concern is within a certain threshold distance (e.g., one mile, one block, 100 feet) of the current location of the electronic device. The certain threshold distance may be selected by the pedestrian and/or user of the electronic device, or may be pre-set (e.g., by a device manufacturer). In some embodiments, the certain threshold distance may depend on the type of safety concern, i.e., based on a threshold distance away from the particular safety concern where a pedestrian should stay to remain safe. As one example, a pedestrian should remain a certain distance away from construction in progress to remain safe, but may need to maintain a greater distance away from a crime in progress to remain safe.

If the location of the safety concern is determined not to be within the certain threshold distance (block 306, NO), an indication of the location of the safety concern may be again requested and/or received (e.g., at block 302), and/or an indication of the current location of the electronic device may be again requested and/or received (e.g., at block 304), and the method may proceed accordingly. The indications of the current location of the safety concern and/or current location of the electronic device may be requested and/or received immediately upon a determination that the location of the safety concern is determined not to be within the certain threshold distance (block 306, NO), or periodically (e.g., one minute after, five seconds after, etc.)

If the location of the safety concern is determined to be within the certain threshold distance of the current location of the electronic device (block 306, YES), an alert may be triggered at block 308 to notify the pedestrian of the safety concern. That is, in some embodiments, the alert may be triggered only when the location of the safety concern is within a certain threshold distance of the current location of the electronic device. The alert may be configured to notify the pedestrian of the safety concern. In various embodiments, the alert may be one or more of a sound, vibration, light, or display of the electronic device associated with the pedestrian. Moreover, the alert may include an indication of the type of safety concern (e.g., crime in progress, fire in progress, construction in progress, etc.) triggering the alert, the location of the safety concern, and/or the proximity of the safety concern (e.g., the distance between the safety concern and the electronic device associated with the pedestrian).

Furthermore, in some embodiments the alert may additionally or alternatively include an indication of the severity of the safety concern. For instance, the severity level may be a color (e.g., red alert, orange alert, yellow alert, etc.) or number system (e.g., level 10 alert, level 5 alert, level 1 alert, etc.). For example, a red alert or a level 10 alert may indicate a very severe safety concern, such as a shooting in progress, a large scale fire, or a large active construction zone, while a yellow alert or a level 1 alert may indicate a less severe safety concern, such as a robbery in progress, a small contained fire, or a currently inactive construction zone. Of course, these are only examples, and any type of severity system may be used which may assign different weights to some of the foregoing safety concern examples for various reasons, leading to differing alert levels.

Additionally or alternatively, a walking route may be generated to assist the pedestrian in avoiding the location of the safety concern. The walking route may be, for instance, displayed via a display (e.g. display unit 114) of the electronic device associated with the pedestrian. In some embodiments, the walking route may be added to existing route guidance, e.g., as an update to a route created before the indication of the safety concern was received.

At block 310, an indication may be received indicating that the location of the safety concern is no longer within a certain threshold distance of the current location of the electronic device. The indication may be received from any of the sources from which the original indication of the location was received, or, in some embodiments, from a different source. Moreover, the indication may be based on periodic or continuous updates of the current location of the electronic device associated with the pedestrian. For instance, the pedestrian may have walked away from the safety concern, and the location of the safety concern may no longer be within the certain threshold distance from the current location of the electronic device associated with the pedestrian. Additionally or alternatively, the indication may be based on periodic or continuous updates of the location of the safety concern. For instance, if the safety concern is in motion (e.g., a fire in progress, a police chase, etc.), the new location of the safety concern may no longer be within the certain threshold distance from the current location of the electronic device associated with the pedestrian.

Additionally or alternatively, at block 312, an indication may be received indicating a dismissal of the alert by the pedestrian. A dismissal of the alert may be received, e.g., via a user interface of the electronic device associated with the pedestrian. In additional or alternative embodiments, a dismissal of the alert may be detected by one or more sensors (e.g., sensors 120) disposed at the electronic device (e.g., a microphone may detect a voice dismissal, an image sensor may detect a gesture dismissal, etc.) Moreover, in some embodiments an indication may be received indicating that the safety concern no longer exists (e.g., a fire may have been put out, perpetuators of a crime may have been brought into custody, construction may be completed, etc.). At block 314, the alert may be ceased, e.g., based on one or more of the indication that the safety concern is no longer within the certain threshold distance of the current location of the electronic device (block 310), the indication of dismissal by the pedestrian (block 312) and/or the indication that the safety concern no longer exists.

Additionally or alternatively, in some embodiments, the methods 200 and 300 depicted in FIG. 2 and FIG. 3 may be combined into a single method through which a pedestrian may be alerted both of nearby crowd activity and of nearby safety concerns.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method for alerting a pedestrian of nearby crowd activity, comprising:

receiving, by an electronic device associated with a pedestrian, an indication of crowd activity, including a size of a crowd, a position of the crowd, and a characterization of the type of crowd activity;

receiving, by the electronic device associated with the pedestrian, an indication of a present position of the electronic device;

triggering, by the electronic device associated with the pedestrian, an alert based on the indication of crowd activity, the alert configured to notify the pedestrian of the crowd activity and the characterization of the type of crowd activity, wherein the alert is triggered only when the size of the crowd exceeds a threshold number of people and the position of the crowd is within a certain threshold distance of the present position of the electronic device; and receiving, by the electronic device, an indication of one or more of the following:
the size of the crowd no longer exceeds the threshold number;
the position of the crowd is no longer within the certain threshold distance of the position of the electronic device; or
a dismissal of the alert by the pedestrian; and
ceasing, by the electronic device, the alert.

2. The computer-implemented method of claim 1, wherein the indication of crowd activity is based on real-time crowd data.

3. The computer-implemented method of claim 2, wherein the real-time crowd data includes location data for a number of other electronic devices connected to a network in communication with the electronic device associated with the pedestrian.

4. The computer-implemented method of claim 1, wherein the indication of crowd activity is based on the popularity of a social media event post, the post including a time and a location of an event.

5. The computer-implemented method of claim 1, wherein the threshold number of people in the crowd and the certain threshold distance between the position of the crowd and the current position of the electronic device associated with the pedestrian are selected by the pedestrian.

6. The computer-implemented method of claim 1, wherein the triggered alert is one or more of a sound, vibration, light, or display of the electronic device associated with the pedestrian.

7. The computer-implemented method of claim 1, wherein the triggered alert includes an indication of the size of the crowd and the position of the crowd.

8. The computer-implemented method of claim 1, wherein triggering the alert based on the crowd activity further comprises:
generating, by the electronic device, a walking route for the pedestrian to avoid the position of the crowd; and
displaying the walking route via a display of the electronic device associated with the pedestrian.

9. A computer-implemented method for alerting a pedestrian of a nearby safety concern, comprising:
receiving, by an electronic device associated with a pedestrian, an indication of a safety concern including a position of the safety concern,
wherein the safety concern is one or more of: crime in progress, fire in progress, or construction in progress;
receiving, by the electronic device associated with the pedestrian, an indication of a current position of the electronic device;
triggering, by the electronic device associated with the pedestrian, an alert based on the indication of the safety concern, the alert configured to notify the pedestrian of the safety concern,
wherein the alert is triggered only when the position of the safety concern is within a certain threshold distance of the current position of the electronic device; and
receiving, by the electronic device, an indication of one or more of the following:
the position of the safety concern is no longer within the certain threshold distance of the current position of the electronic device; or
a dismissal of the alert by the pedestrian; and
ceasing, by the electronic device, the alert.

10. The computer-implemented method of claim 9, wherein the indication of the safety concern is based on a public safety communication received by the electronic device associated with the pedestrian.

11. The computer-implemented method of claim 9, wherein triggering the alert based on the safety concern further comprises:
generating, by the electronic device, a walking route for the pedestrian to avoid the position of the safety concern; and
displaying the walking route via a display of the electronic device associated with the pedestrian.

12. An electronic device associated with a pedestrian and configured to alert the pedestrian of nearby crowd activity, comprising:
a transceiver configured to communicate data via at least one network connection;
a memory configured to store non-transitory computer executable instructions; and
a processor configured to interface with the transceiver and the memory, and configured to execute the non-transitory computer executable instructions to cause the processor to:
receive an indication of crowd activity, including a size of a crowd, a position of the crowd and a characterization of the type of crowd activity;
receive an indication of the current position of the electronic device;
trigger an alert based on the indication of crowd activity, the alert configured to notify the pedestrian of the crowd activity and the characterization of the type of crowd activity,
wherein the alert is triggered only when the size of the crowd exceeds a threshold number of people and the position of the crowd is within a certain threshold distance of the current position of the electronic device; and
receive an indication of one or more of the following:
the size of the crowd no longer exceeds the threshold number;
the position of the crowd is no longer within the certain threshold distance of the current position of the electronic device; or
a dismissal of the alert by the pedestrian; and
cease the alert.

13. The electronic device of claim 12, wherein the indication of crowd activity is based on real-time crowd data.

14. The electronic device of claim 13, wherein the real-time crowd data includes location data for a number of other electronic devices connected to a network in communication with the electronic device associated with the pedestrian.

15. The electronic device of claim 12, wherein the indication of crowd activity is based on the popularity of a social media event post, the post including a time and a location of an event.

16. The electronic device of claim 12, wherein the threshold number of people and the certain threshold distance between the position of the crowd and the current position of the electronic device are selected by the pedestrian.

17. The electronic device of claim 12, wherein the triggered alert is one or more of a sound, vibration, light, or display of the electronic device associated with the pedestrian.

18. The electronic device of claim 12, wherein the triggered alert includes an indication of the size of the crowd and the position of the crowd.

19. The electronic device of claim 12, wherein the instructions causing the processor to trigger the alert based on the crowd activity further include instructions to:

generate a walking route for the pedestrian to avoid the position of the crowd; and display the walking route via a display of the electronic device associated with the pedestrian.

\* \* \* \* \*